Patented Mar. 17, 1953

2,632,014

UNITED STATES PATENT OFFICE 2,632,014

PROCESS FOR PREPARING HIGH MOLECULAR WEIGHT HYDROCARBONS

William F. Gresham, Wilmington, Del., assignor to E. I. du Pont de Nemours and Company, Wilmington, Del., a corporation of Delaware No Drawing. Application November 3, 1951, Serial No. 254,804

3 Claims. (Cl. 260—449)

This invention relates to a catalytic process for preparing high molecular weight hydrocarbons. More particularly, it relates to a process for synthesizing high molecular weight polymethylenes from carbon monoxide and hydrogen.

It is well known that in the presence of specific catalysts and under certain conditions of temperature and pressure carbon monoxide and hydrogen react to give methanol and branched-chain higher alcohols (Patart, U. S. 1,770,165). It is also known that under other reaction conditions involving the use of certain cobalt-containing or ruthenium-containing catalysts the reaction between carbon monoxide and hydrogen leads to the formation of paraffin waxes (Fischer et al. Brennstoff-Chemie 19, 226–30 (1938); ibid., 20, 247–50 (1939); cf. also U. S. Patents 2,352,345 and 2,352,323; Br. Patent 468,434). High molecular weight straight chain alcohols and other oxygen-containing organic compounds also have been obtained by hydrogenation of carbon monoxide in the presence of metals of the eighth group suspended in paraffin hydrocarbons ("Patent Applications in the Field of Fischer-Tropsch and Allied Reactions," vol. II, 1948, translated by Charles A. Meyer & Co., containing the following German patent applications: I. G. Farbenindustrie Aktiengesellschaft: R106 854 IV D/120, January, 1940; O. Z. 14 718 J/z, April 25, 1944; O. Z. 14 225 January 8, 1943; O. Z. 14 226 June 8, 1943; O. Z. 12 880 July 5, 1941). Until quite recently it has not been possible to obtain straight chain alcohols having from 3 to 50 carbon atoms per molecule efficiently or in good yield (cf. the copending application of Hager and Howk, S. N. 87,114, filed April 12, 1949, which discloses the preparation of straight chain primary alcohols from CO and $H_2$ using ruthenium catalyst and water or alcohol as a solvent). Another very recent development in this art is the discovery that the course of the CO-$H_2$ reaction in the presence of water and a ruthenium catalyst is determined by the pH of the medium; strongly alkaline media cause the formation of $C_2$ to $C_{10}$ alcohols (Gresham, S. N. 99,343, filed June 15, 1949) rather than hydrocarbon waxes which are formed when the pH is on the acid side. The waxes previously obtained in aqueous systems were produced simultaneously with compounds of relatively low molecular weight (Fischer and Pichler, Brennstoff-Chemie 20, 247–50 (1939)), the average molecular weight of the reaction products being generally less than 1000. In general these previously known waxy reaction products contained ingredients which could be distilled at high temperatures and low pressures (200° C./2 mm.).

An object of this invention is to prepare paraffin waxes of improved quality and higher molecular weight from carbon monoxide and hydrogen. Another object is to prepare relatively high melting polymethylenes without simultaneously producing oily products. Other objects of the invention appear hereinafter.

It has been discovered in accordance with this invention that the molecular weight of polymethylenes obtainable from carbon monoxide and hydrogen in the presence of water and a ruthenium catalyst depends not only upon the acidity of the medium but also upon the mol ratio of CO:$H_2$ which is employed. This invention provides a process for preparing polymethylenes of improved quality by introducing hydrogen, carbon monoxide and water into a reaction vessel, the mol ratio of CO:$H_2$ being initially greater than 1:1 and preferably from 2:1 to 12.5:1, and heating the reactants in the presence of a ruthenium-containing catalyst and an acidic reagent (generally while controlling and maintaining the pH below 2) at a pressure within the range of 100 to 3000 atmospheres, preferably 200 to 1000 atmospheres, at a temperature within the range of 150° to 300° C.

In determining the nature of the reaction product obtained in the reaction between CO and $H_2$ in the presence of a ruthenium-containing catalyst and water, pH is a very important factor; for example, if no acid or alkali is added and if the pH is not controlled, the reaction mixture becomes acidic due to the formation of carbon dioxide and at least traces of carboxylic acids, and this acidity has a very profound effect upon the subsequent course of the reaction, causing the formation of relatively longer chain products, such as waxy alcohols containing up to 50 or more carbon atoms per molecule. If the pH is initially strongly acidic, high molecular weight waxy products are produced in still greater proportion, and waxy paraffins of relatively higher molecular weight are formed. This is especially true if under these conditions the CO:$H_2$ ratio is high. This is a rather remarkable discovery, because paraffins are richer in hydrogen than are low molecular weight alcohols, and the formation of alcohols should therefore normally be favored by increasing the CO:$H_2$ ratio.

Ruthenium, and compounds thereof, are specific in their effect upon this reaction. Ruthenium is most conveniently introduced into the reaction mixture in the form of its dioxide, which is believed to be reduced in situ. It is quite possible that under the reaction conditions the ruthenium is converted to a ruthenium hydrocarbonyl, but the invention is not necessarily limited by any such explanation or theory.

The ruthenium-containing substances which may be employed in the practice of the invention include not only ruthenium metal, ruthenium oxides (e. g., dioxide, sesquioxide or tetraoxide), and ruthenium carbonyls (e. g., diruthenium nonacarbonyl, ruthenium carbonyl hydride), but also other ruthenium-containing compounds, such as ruthenium salts of organic carboxylic acids, which may give rise to the formation of a ruthenium carbonyl or hydrocarbonyl (or salt thereof) under the reaction conditions. The ruthenium catalysts may be used as such or on a support such as charcoal, alumina, silica gel, silicon carbon, pumice, etc. The quantity of catalyst which is employed is not highly critical, but it is desirable to use a sufficient amount to effect a reasonably rapid reaction, e. g., about 0.001% to about 20% by weight of ruthenium dioxide, or an equivalent weight of ruthenium in any other form, based on the total quantity of reaction mixture. The acidic agents which may be employed include hydrochloric acid, phosphoric acid, cresol, phenol, sulfuric acid, oxalic acid, hydroxyacetic acid, chloroacetic acid, dichloroacetic acid, trichloroacetic acid, hydrated $BF_3$, benzene sulfonic acid, etc. In fact, any method for maintaining and controlling the pH, preferably at a level below about 2, may be employed.

The solid polymethylenes obtained under the preferred conditions disclosed herein have inherent viscosities of about 0.33 to 0.36, measured at 0.25% concentration in tetrahydronaphthalene at 125° C. The melting points of these polymethylenes are within the range of about 126° to 129° C., or slightly higher, it being understood that the melting point does not increase rapidly with molecular weight when the molecular weight is high, e. g. above about 2000.

It is preferable to mix the synthesis gas prior to the reaction, for example, by pressuring the reactants in a vessel fitted with a mixing or agitating means, although the gases may be introduced in the reaction apparatus separately and simultaneously, through baffles or similar devices. If necessary, the gases may be previously deoxygenated, for example by reaction with hot copper or by treatment with a scrubbing solution prepared from equal volumes of 20% aqueous sodium hydroxide and saturated aqueous hydroquinone solution. The gases may also be desulfurized by passing through a tower containing absorbent charcoal, or by conventional chemical desulfurization processes.

The reaction proceeds best within the relatively narrow temperature range of 180° to 225° C. Below 100° C. the reaction is too slow or does not occur.

The pressure has a considerable influence on the course of the reaction. It has been found that at pressures of about 100 to 150 atmospheres, when the reaction medium is acidic, the reaction product consists of hydrocarbon oils and low molecular weight waxes. On the other hand, at pressures substantially exceeding 1000 atmospheres, in either alkaline or acidic media, the reaction yields substantial quantities of volatile hydrocarbons, which is generally undesirable. Thus, the desirable pressure range for formation of highest molecular weight polymethylenes is between 200 and 1000 atmospheres, a still more preferred range being 300 to 1000 atmospheres.

It is often desirable to use in the reaction mixture a dispersing agent to facilitate the intimate mixing of all components, including the water. Any commercial dispersing agent that has no poisoning effect on the catalyst can be used for this purpose. For the same reason, agitation of the reaction mixture is desirable, although not essential.

The process may be carried out batchwise in a suitable pressure vessel. The progress of the reaction may be followed by the drop in pressure, the reaction being continued by further additions of carbon monoxide and hydrogen until an optimum amount of reaction product relative to the size of the vessel has been formed. The process may also be carried out continuously, for example by pumping the gas mixture and the liquid reaction medium at the required pressure over a fixed catalyst bed in a heated zone at a predetermined rate.

The effect of pH on the reaction between carbon monoxide and hydrogen in aqueous media at 190° to 200° C. under 200 to 800 atmospheres pressure at reaction times of 2 to 6 hours in the presence of a ruthenium-containing catalyst (6 grams $RuO_2$ per 325 cc. of reaction space) is set forth in the following table (CO:$H_2$=1:2):

| Solute | Conc'n | pH of Solution In | pH of Solution Out | Total wt., grams | $C_2$-$C_{10}$ alcohol cut (Percent of Total) | $C_{10}$-$C_{15}$ alcohol cut (Percent of Total) | Wax (Percent of Total) |
|---|---|---|---|---|---|---|---|
| $H_3PO_4$ | 0.33 molal (1.0 molal H) | 1.1 | 1.8 | 24 | <3 grams (<12%) | | 21 grams (>88%). |
| Acidic Phosphate Buffer | {0.5 molal $NaH_2PO_4$ / 0.05 molal $Na_2HPO_4$} | 5.4 | | 14 | 3.5 grams (25%) | | 10.5 grams (75%). |
| None | None | 6.6 | 4.8 | 19.4 | 7 grams (36%) | 5 grams (26%) | 7.4 grams (38%). |
| $NH_3$ | 0.5 molal | 11.5 | 7.5 | 16.7 | 6.6 grams (39%) | 3.7 grams (22%) | 6.4 grams (38%). |
| $NaHCO_3$ | do | 8.3 | 7.1 | 22 | 17 grams (77%) | 2 grams (10%) | 3 grams (13%). |
| NaOCHO | do | 8.1 | 7.3 | 18.5 | 15 grams (81%) | | 3.5 grams (19%). |
| NaOH | 1.0 molal | >11 | | 19.6 | 17 grams (82%) | | 2.6 grams (13%). |
| $KHCO_3$ | 0.5 molal | 8.0 | 8.0 | 24 | 22 grams (91%) | | 2.2 grams (9%). |

The data contained in the above table illustrate the fact that a low pH favors the formation of waxes while a high pH favors the formation of $C_2$ to $C_{10}$ alcohols. The effect of variations in CO:$H_2$ ratio are shown in the following table.

*Polymethylene synthesis in aqueous media containing acid and $RuO_2$*

| $CO:H_2$ ratio | Solute | Conc'n | Initial pH | Pressure (atm.) | Reaction Temp., °C. | M. P. (° C.) of Product | Description of Product |
|---|---|---|---|---|---|---|---|
| 1:2 | $H_3PO_4$ | 3 M | 1 | 88–122 | 172–190 | | Oil, and solid distillation residue. Distilled in part at 200° C./2 mm. |
| 1:2 | $H_3PO_4$ | 85% (85% $H_3PO_4$+15% $H_2O$) | <1 | 320–515 | 175–206 | 122 | Distillation of 23.1 grams gave 3.5 grams oil, B. P. 200°/3 mm. |
| 1:1 | $H_3PO_4$ | 85% | <1 | 240–310 | 179–202 | 122 | Good film-forming resin. Entirely polymethylene. |
| 2:1 | $H_3PO_4$ | 85% | <1 | 250–320 | 180–188 | 126 | |
| 4:1 | $H_3PO_4$ | 85% | <1 | 280–307 | 180–200 | 127 | Do. |
| 8:1 | $H_3PO_4$ | 85% | <1 | 287–314 | 180–195 | 128.5 | Do. |
| 12.5:1 | $H_3PO_4$ | 85% | <1 | 290–320 | 180–190 | 129 | Good film-forming resin. Entirely polymethylene. Intrinsic viscosity[1]=.329. |

[1] Determined in tetralin at 125° C., conc.=0.25 gram/100 ml.

As can be seen by the foregoing description, this invention makes it possible to synthesize from carbon monoxide and hydrogen polymethylene hydrocarbons as the sole products, said polymethylenes having relatively high melting points, i. e. containing relatively small quantities of the distillable ingredients which lower the melting point.

The polymethylenes provided by this invention may be used as ingredients of chewing gum, impregnated paper, etc., and in the manufacture of chlorosulfonated polymethylenes, chlorinated polymethylenes, foils, fibers, molded products, adhesives including those made by peroxide curing, bags and other receptacles including those which are used as capsules for rubber-mix materials where the capsule is itself added to the rubber-mix, dispersions for coating materials, blends with polythene, polyisobutylene, etc.

This application is a continuation-in-part of my copending application S. N. 148,507, filed March 8, 1950, which in turn is a continuation-in-part of my application S. N. 99,343 which was filed on June 15, 1949, now U. S. Patent No. 2,535,060.

I claim:

1. A process for preparing polymethylenes which comprises introducing into a reaction vessel a mixture of carbon monoxide, hydrogen, water and an acidic reagent capable of maintaining the pH of the mixture below 1, the mol ratio of carbon monoxide to hydrogen being of from 2:1 to 12.5:1, heating the said mixture in the presence of a ruthenium-containing substance at a temperature within the range of 180° to 225° C. under a pressure within the range of 200 to 800 atmospheres, whereby a reaction occurs resulting in the formation of solid polymethylenes, and thereafter separating the said polymethylenes from the resulting mixture.

2. A process for preparing polymethylenes which comprises introducing into a reaction vessel ruthenium dioxide, carbon monoxide, hydrogen, water, and phosphoric acid, heating the resulting mixture at a temperature within the range of 180° C. to 225° C. and at a pressure within the range of 200 to 800 atmospheres, the mol ratio of carbon monoxide to hydrogen being initially from 2:1 to 12.5:1, whereby a reaction occurs resulting in the formation of a mixture of polymethylenes having melting points of 126° to 129° C. as the sole reaction products, said polymethylenes having inherent viscosities of 0.33 to 0.36, measured at 0.25% concentration in tetrahydronaphthalene at 125° C., and thereafter separating the said polymethylenes from the resulting mixture.

3. The process of claim 2 in which the weight of phosphoric acid is 85% of the total weight of water plus phosphoric acid.

WILLIAM F. GRESHAM.

REFERENCES CITED

The following references are of record in the file of this patent:

UNITED STATES PATENTS

| Number | Name | Date |
|---|---|---|
| 2,352,328 | Kleine | June 27, 1944 |